United States Patent
Asano

(10) Patent No.: US 12,428,300 B2
(45) Date of Patent: Sep. 30, 2025

(54) CONDUCTIVE MATERIAL DISPERSION LIQUID, METHOD OF PRODUCING SLURRY FOR NON-AQUEOUS SECONDARY BATTERY POSITIVE ELECTRODE, METHOD OF PRODUCING POSITIVE ELECTRODE FOR NON-AQUEOUS SECONDARY BATTERY, AND METHOD OF PRODUCING NON-AQUEOUS SECONDARY BATTERY

(71) Applicant: ZEON CORPORATION, Tokyo (JP)

(72) Inventor: Junichi Asano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 453 days.

(21) Appl. No.: 18/245,159

(22) PCT Filed: Aug. 31, 2021

(86) PCT No.: PCT/JP2021/032004
§ 371 (c)(1),
(2) Date: Mar. 14, 2023

(87) PCT Pub. No.: WO2022/070736
PCT Pub. Date: Apr. 7, 2022

(65) Prior Publication Data
US 2023/0382737 A1    Nov. 30, 2023

(30) Foreign Application Priority Data
Sep. 29, 2020    (JP) ................. 2020-164137

(51) Int. Cl.
| | | |
|---|---|---|
| *C01B 32/174* | (2017.01) | |
| *H01M 4/02* | (2006.01) | |
| *H01M 4/04* | (2006.01) | |
| *H01M 10/0525* | (2010.01) | |

(52) U.S. Cl.
CPC ......... *C01B 32/174* (2017.08); *H01M 4/0416* (2013.01); *H01M 10/0525* (2013.01); *C01B 2202/32* (2013.01); *C01B 2202/36* (2013.01); *C01P 2006/12* (2013.01); *H01M 2004/028* (2013.01)

(58) Field of Classification Search
CPC .............. C01B 32/174; C01B 2202/32; C01B 2202/36; H01M 4/0416; H01M 10/0525; H01M 2004/028; H01M 4/13; H01M 4/131; H01M 4/0404; H01M 4/622; H01M 4/139; H01M 4/62; H01M 4/625; H01M 10/052; C01P 2006/12; C08K 2201/001; C08K 2201/003; C08K 2201/006; C08C 19/02; C08L 15/005; C09D 109/02; Y02E 60/10

See application file for complete search history.

(56) References Cited

U.S. PATENT DOCUMENTS

| | | |
|---|---|---|
| 2015/0329693 A1 | 11/2015 | Shigeta et al. |
| 2016/0240279 A1 | 8/2016 | Shigeta et al. |
| 2018/0226650 A1 | 8/2018 | Yoo et al. |
| 2018/0277848 A1 | 9/2018 | Matsumura et al. |
| 2019/0051887 A1* | 2/2019 | Yoo .................... H01M 4/0404 |
| 2021/0005894 A1 | 1/2021 | Murase et al. |

FOREIGN PATENT DOCUMENTS

| | | |
|---|---|---|
| CN | 105658721 A | 6/2016 |
| CN | 108064255 A | 5/2018 |
| EP | 3355392 A1 | 8/2018 |
| EP | 3683868 A1 | 7/2020 |
| KR | 1020200053487 A | 5/2020 |
| WO | 2019181869 A1 | 9/2019 |

OTHER PUBLICATIONS

Translation Written Opinion of the International Searching Authority in PCT/JP2021/032004 dated Mar. 28, 2023 (Year: 2023).*
Mar. 28, 2023, International Preliminary Report on Patentability issued in the International Patent Application No. PCT/JP2021/032004.
Jul. 28, 2025, the Extended European Search Report issued by the European Patent Office in the corresponding European Patent Application No. 21875038.8.

* cited by examiner

Primary Examiner — Daniel C. McCracken
(74) Attorney, Agent, or Firm — KENJA IP LAW PC

(57) ABSTRACT

Provided is a technique that makes it possible to cause a secondary battery to display excellent output characteristics and other characteristics. Secondary battery production is performed using a conductive material dispersion liquid that contains a conductive material, a dispersant, and a solvent. The conductive material is one or more carbon nanotubes having a specific surface area of not less than 800 m$^2$/g and not more than 1,300 m$^2$/g and having a volume-average particle diameter (D90) of 50 μm or less in the conductive material dispersion liquid. The dispersant is a hydrogenated acrylonitrile-butadiene copolymer having a weight-average molecular weight of 200,000 or less.

8 Claims, No Drawings

CONDUCTIVE MATERIAL DISPERSION LIQUID, METHOD OF PRODUCING SLURRY FOR NON-AQUEOUS SECONDARY BATTERY POSITIVE ELECTRODE, METHOD OF PRODUCING POSITIVE ELECTRODE FOR NON-AQUEOUS SECONDARY BATTERY, AND METHOD OF PRODUCING NON-AQUEOUS SECONDARY BATTERY

TECHNICAL FIELD

The present disclosure relates to a conductive material dispersion liquid, a method of producing a slurry for a non-aqueous secondary battery positive electrode, a method of producing a positive electrode for a non-aqueous secondary battery, and a method of producing a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. Consequently, in recent years, studies have been made to improve battery members such as electrodes with the aim of achieving even higher secondary battery performance.

A positive electrode for a secondary battery normally includes a current collector and a positive electrode mixed material layer formed on the current collector. This positive electrode mixed material layer is formed, for example, using a slurry for a secondary battery positive electrode that contains a positive electrode active material, a conductive material, and a binder dispersed in a dispersion medium.

Attempts have been made to improve slurries for secondary battery positive electrodes in recent years in order to achieve further improvement of secondary battery performance.

As one example, Patent Literature (PTL) 1 proposes a slurry for a secondary battery electrode that contains an electrode active material and a carbon nanotube dispersion liquid. The carbon nanotube dispersion liquid described in PTL 1 contains carbon nanotubes, a binder, and a dispersion medium, wherein the binder includes a polymer (A) including specific structural units, the proportion constituted by the binder relative to all solid content in the carbon nanotube dispersion liquid is not more than a specific value, and the viscosity change of the carbon nanotube dispersion liquid between before and after being left for 1 week is within a specific range.

CITATION LIST

Patent Literature

PTL 1: WO2019/181869A1

SUMMARY

Technical Problem

However, there is room for further improvement of a secondary battery produced using a conventional slurry for a secondary battery positive electrode such as described in PTL 1 in terms of further improving electrical characteristics such as output characteristics and cycle characteristics.

Accordingly, one object of the present disclosure is to provide a method of producing a slurry for a non-aqueous secondary battery positive electrode that can cause a secondary battery to display excellent output characteristics and cycle characteristics and also a conductive material dispersion liquid that can suitably be used to produce this slurry for a secondary battery positive electrode.

Another object of the present disclosure is to provide a method of producing a positive electrode for a non-aqueous secondary battery that can cause a secondary battery to display excellent output characteristics and cycle characteristics.

Yet another object of the present disclosure is to provide a method of producing a non-aqueous secondary battery having excellent output characteristics and cycle characteristics.

Solution to Problem

The inventor focused on the fact that output characteristics of a secondary battery can be improved by using carbon nanotubes (hereinafter, also referred to as "CNTs") having a large specific surface area, such as single-walled carbon nanotubes, as a conductive material of the secondary battery. However, according to studies conducted by the inventor, the use of CNTs having a large specific surface area in production of a slurry for a secondary battery positive electrode results in reduction of drawability of the obtained slurry for a secondary battery positive electrode. Moreover, since it is difficult to uniformly apply such a slurry for a positive electrode onto a current collector, this results in increased surface roughness of a positive electrode mixed material layer that is formed through application of the slurry for a positive electrode. Such surface roughness is a main cause of deterioration of cycle characteristics in a secondary battery.

Through further studies, the inventor reached a new finding that by using a hydrogenated acrylonitrile-butadiene copolymer (H-NBR) of low molecular weight in combination with CNTs having a large specific surface area, it is possible to solve the problem set forth above. The inventor completed the present disclosure based on these findings.

Specifically, the present disclosure aims to advantageously solve the problem set forth above, and a presently disclosed conductive material dispersion liquid comprises a conductive material, a dispersant, and a solvent, wherein the conductive material is one or more carbon nanotubes having a specific surface area of not less than 800 $m^2/g$ and not more than 1,300 $m^2/g$, the carbon nanotubes have a volume-average particle diameter (D90) of 50 μm or less in the conductive material dispersion liquid, the dispersant is a hydrogenated acrylonitrile-butadiene copolymer, and the hydrogenated acrylonitrile-butadiene copolymer has a weight-average molecular weight of 200,000 or less. Through a conductive material dispersion liquid that contains CNTs having a specific surface area of not less than 800 $m^2/g$ and not more than 1,300 $m^2/g$ and having a volume-average particle diameter (D90) of 50 μm or less in the conductive material dispersion liquid as a conductive material, a hydrogenated acrylonitrile-butadiene copolymer having a weight-average molecular weight of 200,000 or less as a dispersant, and a solvent in this manner, it is possible to cause a slurry for a secondary battery positive electrode to display excellent slurry stability and coating uniformity.

Note that the "volume-average particle diameter (D90) of CNTs in a conductive material dispersion liquid" that is referred to in the present specification is the particle diameter of CNTs in a conductive material dispersion liquid at which cumulative volume calculated from a small diameter end of a particle size distribution (by volume) measured by laser diffraction reaches 90%.

Moreover, the "specific surface area", "volume-average particle diameter (D90) of CNTs in a conductive material dispersion liquid", and "weight-average molecular weight" referred to in the present disclosure can be determined by methods described in the EXAMPLES section of the present specification.

In the presently disclosed conductive material dispersion liquid, the hydrogenated acrylonitrile-butadiene copolymer preferably has an iodine value of 25 mg/100 mg or less. When the iodine value of the hydrogenated acrylonitrile-butadiene copolymer is 25 mg/100 mg or less, dispersibility of the conductive material in the conductive material dispersion liquid can be improved. Moreover, by using this conductive material dispersion liquid, it is possible to improve slurry stability of a slurry for a secondary battery positive electrode and also to improve cycle characteristics of a secondary battery that is produced using the slurry for a secondary battery positive electrode.

Note that the "iodine value" referred to in the present disclosure can be determined by a method described in the EXAMPLES section of the present specification.

In the presently disclosed conductive material dispersion liquid, content of the dispersant in the conductive material dispersion liquid is preferably not less than 50 parts by mass and not more than 400 parts by mass per 100 parts by mass of the conductive material. When the content of the dispersant in the conductive material dispersion liquid is within the range set forth above, both slurry stability and coating uniformity of a slurry for a secondary battery positive electrode can be further improved.

Moreover, the present disclosure aims to advantageously solve the problem set forth above, and a presently disclosed method of producing a slurry for a non-aqueous secondary battery positive electrode comprises mixing a positive electrode active material, a binder, and any one of the conductive material dispersion liquids set forth above to obtain a slurry for a non-aqueous secondary battery positive electrode. By mixing a positive electrode active material, a binder, and the presently disclosed conductive material dispersion liquid in this manner, it is possible to efficiently produce a slurry for a secondary battery positive electrode having excellent slurry stability and coating uniformity.

In the presently disclosed method of producing a slurry for a non-aqueous secondary battery positive electrode, content of the conductive material in the slurry for a non-aqueous secondary battery positive electrode is preferably less than 0.1 parts by mass per 100 parts by mass of the positive electrode active material. When the content of the conductive material in the slurry for a secondary battery positive electrode is less than 0.1 parts by mass per 100 parts by mass of the positive electrode active material, slurry stability and coating uniformity of the obtained slurry for a secondary battery positive electrode can be further improved.

In the presently disclosed method of producing a slurry for a non-aqueous secondary battery positive electrode, content of the binder in the slurry for a non-aqueous secondary battery positive electrode is preferably not less than 0.1 parts by mass and not more than 6 parts by mass per 100 parts by mass of the positive electrode active material. When the content of the binder in the slurry for a secondary battery positive electrode is within the range set forth above, close adherence between a positive electrode mixed material layer and a current collector can be increased in a positive electrode that is produced using the slurry for a secondary battery positive electrode, and resistance of a secondary battery can be suppressed to a low level.

Furthermore, the present disclosure aims to advantageously solve the problem set forth above, and a presently disclosed method of producing a positive electrode for a non-aqueous secondary battery comprises forming a positive electrode mixed material layer using a slurry for a non-aqueous secondary battery positive electrode obtained by the method set forth above. By forming a positive electrode mixed material layer using a slurry for a non-aqueous secondary battery positive electrode that has been obtained by the method set forth above, it is possible to produce a positive electrode for a secondary battery that can cause a secondary battery to display excellent output characteristics and cycle characteristics.

Also, the present disclosure aims to advantageously solve the problem set forth above, and a presently disclosed method of producing a non-aqueous secondary battery comprises using a positive electrode for a non-aqueous secondary battery obtained by the method of producing a positive electrode for a non-aqueous secondary battery set forth above. By using a positive electrode for a non-aqueous secondary battery that has been obtained by the method set forth above in this manner, it is possible to produce a secondary battery having excellent output characteristics and cycle characteristics.

Advantageous Effect

According to the present disclosure, it is possible to provide a method of producing a slurry for a secondary battery positive electrode that can cause a secondary battery to display excellent output characteristics and cycle characteristics and also a conductive material dispersion liquid that can suitably be used to produce this slurry for a secondary battery positive electrode.

Moreover, according to the present disclosure, it is possible to provide a method of producing a positive electrode for a secondary battery that can cause a secondary battery to display excellent output characteristics and cycle characteristics.

Furthermore, according to the present disclosure, it is possible to provide a method of producing a secondary battery having excellent output characteristics and cycle characteristics.

DETAILED DESCRIPTION

The following provides a detailed description of embodiments of the present disclosure.

The presently disclosed conductive material dispersion liquid can be used in production of a slurry for a secondary battery positive electrode. Moreover, the presently disclosed method of producing a slurry for a secondary battery positive electrode uses the presently disclosed conductive material dispersion liquid to produce a slurry for a secondary battery positive electrode. Furthermore, the presently disclosed method of producing a positive electrode for a secondary battery uses a slurry for a secondary battery positive electrode that has been obtained by the presently disclosed method of producing a slurry for a secondary battery positive electrode. Also, the presently disclosed method of producing a secondary battery uses a positive electrode that has been obtained by the presently disclosed method of producing a positive electrode for a secondary battery.

(Conductive Material Dispersion Liquid)

The presently disclosed conductive material dispersion liquid is required to contain a conductive material, a dispersant, and a solvent. The presently disclosed conductive material dispersion liquid may further contain additives in addition to the aforementioned components. Note that a "conductive material dispersion liquid" referred to in the present specification does not normally contain a positive electrode active material.

As a result of the presently disclosed conductive material dispersion liquid containing a conductive material, a dispersant, and a solvent that are more specifically described below, it is possible to produce a slurry for a secondary battery positive electrode having excellent slurry stability and coating uniformity by using the presently disclosed conductive material dispersion liquid. Moreover, by using this slurry for a secondary battery positive electrode, it is possible to produce a positive electrode that can cause a secondary battery to display excellent output characteristics and cycle characteristics.

<Conductive Material>

The conductive material is a material for ensuring electrical contact among a positive electrode active material in a positive electrode mixed material layer. Although single-walled CNTs and/or multi-walled CNTs may be used as the conductive material that is used in the presently disclosed conductive material dispersion liquid, it is preferable to use CNTs having from one to five walls, and more preferable to use single-walled CNTs. The CNTs may be surface treated by a strong acid such as nitric acid or sulfuric acid.

[Specific Surface Area of CNTs]

The specific surface area of the CNTs is required to be 800 $m^2/g$ or more, and is preferably 850 $m^2/g$ or more. Moreover, the specific surface area of the CNTs is required to be 1,300 $m^2/g$ or less, and is preferably 1,250 $m^2/g$ or less. When the specific surface area of the CNTs is within any of the ranges set forth above, dispersibility of the conductive material can be ensured while also enabling formation of good electrical conduction paths in a positive electrode mixed material layer, which makes it possible to further improve coating uniformity of a slurry for a secondary battery positive electrode and output characteristics of a secondary battery.

[Volume-Average Particle Diameter (D90) of CNTs in Conductive Material Dispersion Liquid]

The volume-average particle diameter (D90) of the CNTs in the conductive material dispersion liquid is required to be 50 µm or less, and is preferably 45 µm or less, more preferably 40 µm or less, and even more preferably 30 µm or less. When the volume-average particle diameter (D90) of the CNTs in the conductive material dispersion liquid is 50 µm or less, dispersibility of the conductive material (CNTs) in the conductive material dispersion liquid can be further improved. Consequently, slurry stability of a slurry for a secondary battery positive electrode can be further improved by using the conductive material dispersion liquid, and cycle characteristics of a secondary battery produced using this slurry for a secondary battery positive electrode can be further improved.

Note that the volume-average particle diameter (D90) of the CNTs in the conductive material dispersion liquid can be adjusted as appropriate through alteration of mixing conditions in production of the conductive material dispersion liquid.

The production method of CNTs used as the conductive material herein may be a known CNT production method such as arc discharge, laser ablation, or chemical vapor deposition (CVD), for example, without any specific limitations.

<Dispersant>

The dispersant is for causing dispersion of the conductive material contained in the conductive material dispersion liquid. A hydrogenated acrylonitrile-butadiene copolymer is adopted as the dispersant that is used in the presently disclosed conductive material dispersion liquid. The hydrogenated acrylonitrile-butadiene copolymer is a hydrogenated product in which carbon-carbon unsaturated bonds originating from a conjugated diene monomer in main and side chains of an acrylonitrile-butadiene copolymer have been partially or completely hydrogenated.

As a result of a hydrogenated acrylonitrile-butadiene copolymer being used as the dispersant in the presently disclosed conductive material dispersion liquid, it is possible to reduce surface roughness of a positive electrode mixed material layer and improve cycle characteristics of a secondary battery when using this conductive material dispersion liquid.

[Properties of Hydrogenated Acrylonitrile-Butadiene Copolymer]

{Weight-Average Molecular Weight}

The weight-average molecular weight of the hydrogenated acrylonitrile-butadiene copolymer that is used herein is required to be 200,000 or less, and is preferably 100,000 or less, more preferably 80,000 or less, and even more preferably 60,000 or less. By using a low-molecular weight hydrogenated acrylonitrile-butadiene copolymer that has a weight-average molecular weight of 200,000 or less in this manner, it is possible to cause a slurry for a secondary battery positive electrode to display both excellent slurry stability and coating uniformity.

Note that the weight-average molecular weight of the hydrogenated acrylonitrile-butadiene copolymer can be adjusted as appropriate through alteration of the chemical composition of the hydrogenated acrylonitrile-butadiene copolymer and the hydrogenation conditions, for example.

{Iodine Value}

The iodine value of the hydrogenated acrylonitrile-butadiene copolymer that is used herein is preferably 25 mg/100 mg or less, more preferably 23 mg/100 mg or less, and even more preferably 20 mg/100 mg or less. When the iodine value of the hydrogenated acrylonitrile-butadiene copolymer is 25 mg/100 mg or less, dispersibility of the conductive material in the conductive material dispersion liquid can be improved. Moreover, slurry stability of a slurry for a secondary battery positive electrode can be improved by using this conductive material dispersion liquid, and cycle characteristics of a secondary battery produced using this slurry for a secondary battery positive electrode can be improved.

The iodine value of the hydrogenated acrylonitrile-butadiene copolymer may be 3 mg/100 mg or more, for example. The iodine value of the hydrogenated acrylonitrile-butadiene copolymer can be adjusted through alteration of hydrogenation reaction conditions in production of the hydrogenated acrylonitrile-butadiene copolymer.

{Structural Units}

The hydrogenated acrylonitrile-butadiene copolymer that is used herein includes a nitrile group-containing monomer unit and a linear alkylene structural unit having a carbon number of 4 or more, and may optionally further include monomer units other than a nitrile group-containing monomer unit and a linear alkylene structural unit having a carbon number of 4 or more.

—Nitrile Group-Containing Monomer Unit—

A "nitrile group-containing monomer unit" referred to in the present disclosure is a repeating unit derived from a nitrile group-containing monomer.

Examples of nitrile group-containing monomers that can form a nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these nitrile group-containing monomers, acrylonitrile is preferable. One of these nitrile group-containing monomers may be used individually, or two or more of these nitrile group-containing monomers may be used in combination.

The proportional content of nitrile group-containing monomer units in the hydrogenated acrylonitrile-butadiene copolymer when all repeating units (total of monomer units and structural units) in the hydrogenated acrylonitrile-butadiene copolymer are taken to be 100 mass % is preferably 20 mass % or more, more preferably 23 mass % or more, and even more preferably 25 mass % or more, and is preferably 50 mass % or less, and more preferably 45 mass % or less. When the proportional content of nitrile group-containing monomer units in the hydrogenated acrylonitrile-butadiene copolymer is not less than any of the lower limits set forth above, cycle characteristics can be improved in a positive electrode for a secondary battery that is produced using the presently disclosed conductive material dispersion liquid. Moreover, when the proportional content of nitrile group-containing monomer units in the hydrogenated acrylonitrile-butadiene copolymer is not more than any of the upper limits set forth above, flexibility of an electrode can be even further improved.

—Linear Alkylene Structural Unit Having Carbon Number of 4 or More—

A "linear alkylene structural unit having a carbon number of 4 or more" referred to in the present disclosure is a repeating unit that is composed of an alkylene structure represented by a general formula: —$C_nH_{2n}$— (n is an integer of 4 or more).

No specific limitations are placed on the method by which the alkylene structural unit having a carbon number of 4 or more is introduced. For example, either of the following methods (1) or (2) may be used.

(1) A method in which a polymer is produced from a monomer composition containing a conjugated diene monomer and then this polymer is hydrogenated so as to convert a conjugated diene monomer unit to an alkylene structural unit (2) A method in which a polymer is produced from a monomer composition containing a 1-olefin monomer having a carbon number of 4 or more Of these methods, method (1) is preferable in terms of ease of production of the polymer.

The conjugated diene monomer may be a conjugated diene compound having a carbon number of 4 or more such as 1,3-butadiene, isoprene, 2,3-dimethyl-1,3-butadiene, or 1,3-pentadiene, for example. Of these conjugated diene compounds, 1,3-butadiene is preferable. In other words, the linear alkylene structural unit having a carbon number of 4 or more is preferably a structural unit obtained through hydrogenation of a conjugated diene monomer unit (i.e., is preferably a hydrogenated conjugated diene unit), and is more preferably a structural unit obtained through hydrogenation of a 1,3-butadiene monomer unit (i.e., is more preferably a hydrogenated 1,3-butadiene unit).

Selective hydrogenation of a conjugated diene monomer unit can, for example, be carried out by a commonly known method such as an oil-layer hydrogenation method or a water-layer hydrogenation method.

The 1-olefin monomer having a carbon number of 4 or more may be 1-butene, 1-hexene, or the like, for example.

One of these monomers may be used individually, or two or more of these monomers may be used in combination.

The proportional content of linear alkylene structural units having a carbon number of 4 or more in the hydrogenated acrylonitrile-butadiene copolymer when all repeating units (total of monomer units and structural units) in the hydrogenated acrylonitrile-butadiene copolymer are taken to be 100 mass % is preferably 20 mass % or more, more preferably 23 mass % or more, and even more preferably 25 mass % or more, and is preferably 70 mass % or less, more preferably 50 mass % or less, even more preferably 45 mass % or less, and particularly preferably 40 mass % or less. When the proportional content of linear alkylene structural units having a carbon number of 4 or more in the hydrogenated acrylonitrile-butadiene copolymer is not less than any of the lower limits set forth above, a positive electrode having even further improved output characteristics can be produced when using a slurry for a secondary battery positive electrode that contains the conductive material dispersion liquid. Moreover, when the proportional content of linear alkylene structural units having a carbon number of 4 or more in the hydrogenated acrylonitrile-butadiene copolymer is not more than any of the upper limits set forth above, solubility of the hydrogenated acrylonitrile-butadiene copolymer in a solvent such as N-methyl-2-methylpyrrolidone (NMP) is ensured, which enables good dispersion of the conductive material in the conductive material dispersion liquid.

Examples of other monomer units include an aromatic vinyl monomer unit, a hydrophilic group-containing monomer unit, and so forth.

—Aromatic Vinyl Monomer Unit—

An "aromatic vinyl monomer unit" referred to in the present disclosure is a repeating unit derived from an aromatic vinyl monomer. Examples of aromatic vinyl monomers that can form an aromatic vinyl monomer unit include styrene, α-methylstyrene, vinyltoluene, and divinylbenzene. Of these aromatic vinyl monomers, styrene is preferable. One of these aromatic vinyl monomers may be used individually, or two or more of these aromatic vinyl monomers may be used in combination.

The proportional content of aromatic vinyl monomer units in the hydrogenated acrylonitrile-butadiene copolymer when all repeating units (total of monomer units and structural units) in the hydrogenated acrylonitrile-butadiene copolymer are taken to be 100 mass % is preferably 20 mass % or more, and more preferably 30 mass % or more, and is preferably 60 mass % or less, and more preferably 50 mass % or less. When the proportional content of aromatic vinyl monomer units in the hydrogenated acrylonitrile-butadiene copolymer is within any of the ranges set forth above, dispersibility of the conductive material in the conductive material dispersion liquid even further improves. Consequently, slurry stability of a slurry for a secondary battery positive electrode can be even further improved by using this conductive material dispersion liquid, and cycle characteristics of a secondary battery can be even further improved by using this slurry for a secondary battery positive electrode.

—Hydrophilic Group-Containing Monomer Unit—

A "hydrophilic group-containing monomer unit" referred to in the present disclosure is a repeating unit derived from a hydrophilic group-containing monomer unit. Examples of hydrophilic group-containing monomers that can form a hydrophilic group-containing monomer unit include polymerizable monomers having a hydrophilic group. More specifically, a monomer that includes an acidic group-containing monomer unit, a hydroxy group-containing monomer unit, a salt of either thereof, or the like may be used as a hydrophilic group-containing monomer. The acidic group-containing monomer unit may be a carboxy group, a sulfo group, a phosphate group, or the like.

Examples of carboxy group-containing monomers include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of acid anhydrides of dicarboxylic acids include maleic anhydride, acrylic anhydride, methylmaleic anhydride, and dimethylmaleic anhydride.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Furthermore, an acid anhydride that produces a carboxy group through hydrolysis can also be used as a carboxy group-containing monomer.

Other examples include monoesters and diesters of α,β-ethylenically unsaturated polybasic carboxylic acids such as maleic acid monoesters, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)acrylsulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)acryl" is used to indicate "acryl" and/or "methacryl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2=CR^1-COO-(C_qH_{2q}O)_p-H$ (where p represents an integer of 2 to 9, q represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether. Of these hydrophilic group-containing monomers, carboxy group-containing monomers are preferable, and methacrylic acid is more preferable. One of these hydrophilic group-containing monomers may be used individually, or two or more of these hydrophilic group-containing monomers may be used in combination.

The proportional content of hydrophilic group-containing monomer units in the hydrogenated acrylonitrile-butadiene copolymer when all repeating units (total of monomer units and structural units) in the hydrogenated acrylonitrile-butadiene copolymer are taken to be 100 mass % is preferably 0.1 mass % or more, and more preferably 1 mass % or more, and is preferably 10 mass % or less, and more preferably 8 mass % or less. When the proportional content of hydrophilic group-containing monomer units in the hydrogenated acrylonitrile-butadiene copolymer is not less than any of the lower limits set forth above, electrode flexibility can be improved in a positive electrode for a secondary battery that is produced using a slurry for a secondary battery positive electrode containing the presently disclosed conductive material dispersion liquid. Moreover, when the proportional content of hydrophilic group-containing monomer units in the hydrogenated acrylonitrile-butadiene copolymer is not more than any of the upper limits set forth above, battery resistance of a secondary battery can be reduced in a situation in which a secondary battery is produced using a slurry for a secondary battery positive electrode that contains the presently disclosed conductive material dispersion liquid.

[Production Method of Hydrogenated Acrylonitrile-Butadiene Copolymer]

No specific limitations are placed on the method by which the hydrogenated acrylonitrile-butadiene copolymer described above is produced. For example, the hydrogenated acrylonitrile-butadiene copolymer can be produced by performing polymerization of a monomer composition containing the above-described monomers, optionally in the presence of a molecular weight modifier and/or inhibitor, to obtain a copolymer, and then performing a hydrogenation reaction of the copolymer.

The polymerization method of the acrylonitrile-butadiene copolymer is not specifically limited and may, for example, be any of solution polymerization, suspension polymerization, bulk polymerization, and emulsion polymerization. Moreover, ionic polymerization, radical polymerization, living radical polymerization, or the like may be adopted as the polymerization reaction.

Commonly used emulsifiers, dispersants, polymerization initiators, polymerization aids, molecular weight modifiers, inhibitors, and so forth may be used in the polymerization in an amount that is also the same as commonly used. Note that a solution containing the hydrogenated acrylonitrile-butadiene copolymer and a polymerization solvent that is obtained through polymerization of the aforementioned monomer composition may be used in that form to produce the conductive material dispersion liquid. Also note that the hydrogenation reaction can be performed according to any known method without any specific limitations.

[Content of Dispersant]

The content of the dispersant (i.e., the hydrogenated acrylonitrile-butadiene copolymer) in the conductive material dispersion liquid is preferably 50 parts by mass or more, and more preferably 100 parts by mass or more per 100 parts by mass of the conductive material, and is preferably 400 parts by mass or less, and more preferably 300 parts by mass or less per 100 parts by mass of the conductive material. When the content of the dispersant in the conductive material dispersion liquid is not less than any of the lower limits set forth above, a slurry for a secondary battery positive electrode obtained using the conductive material dispersion liquid can be provided with both even better slurry stability and even better coating uniformity. Moreover, when the content of the dispersant in the conductive material dispersion liquid is not more than any of the upper limits set forth above, it is possible to suppress an increase of resistance in a secondary battery that is produced using a slurry for a secondary battery positive electrode containing the conductive material dispersion liquid and to provide the secondary battery with excellent output characteristics.

{Solvent}

No specific limitations are placed on the solvent that is contained in the conductive material dispersion liquid. For example, an organic solvent can be used as the solvent. Examples of organic solvents that may be used include alicyclic hydrocarbons such as cyclopentane and cyclohexane; aromatic hydrocarbons such as toluene, xylene, and ethylbenzene; ketones such as acetone, ethyl methyl ketone, diisopropyl ketone, cyclohexanone, methylcyclohexane, and ethylcyclohexane; chlorinated aliphatic hydrocarbons such as methylene chloride, chloroform, and carbon tetrachloride; esters such as ethyl acetate, butyl acetate, γ-butyrolactone, and ε-caprolactone; acylonitriles such as acetonitrile and propionitrile; ethers such as tetrahydrofuran and ethylene glycol diethyl ether; alcohols such as methanol, ethanol, isopropanol, ethylene glycol, and ethylene glycol monomethyl ether; and amides such as N-methyl-2-methylpyrrolidone (NMP) and N,N-dimethylformamide. Of these solvents, NMP is preferable. One of these solvents may be used individually, or two or more of these solvents may be used as a mixed solvent.

<Additives>

Examples of additives that can optionally be contained in the presently disclosed conductive material dispersion liquid include, but are not specifically limited to, surface tension modifiers, viscosity modifiers, and reinforcing materials. One of these additives may be used individually, or two or more of these additives may be used in combination.

<Production of Conductive Material Dispersion Liquid>

The presently disclosed conductive material dispersion liquid can be produced by mixing the above-described conductive material, dispersant, solvent, and optional additives by a known method. Specifically, the conductive material dispersion liquid can be produced by mixing the above-described components using a mixer such as a disper blade, a ball mill, a sand mill, a bead mill, a pigment disperser, a grinding machine, an ultrasonic disperser, a homogenizer, a planetary mixer, or a FILMIX. Note that the solid content concentration of the conductive material dispersion liquid can be not less than 0.5 mass % and not more than 25 mass %, for example.

The obtained conductive material dispersion liquid can suitably be used, for example, in the presently disclosed method of producing a slurry for a secondary battery positive electrode, which is described below.

(Method of Producing Slurry for Secondary Battery Positive Electrode)

In the presently disclosed method of producing a slurry for a secondary battery positive electrode, a positive electrode active material, a binder, and the presently disclosed conductive material dispersion liquid set forth above are mixed to obtain a slurry for a secondary battery positive electrode. Note that other components besides those described above may be further mixed in the presently disclosed method of producing a slurry for a secondary battery positive electrode. The presently disclosed production method makes it possible to obtain a slurry for a secondary battery positive electrode having excellent slurry stability and coating uniformity by using the presently disclosed conductive material dispersion liquid. The following describes the positive electrode active material, binder, and other components in order.

<Positive Electrode Active Material>

The positive electrode active material is a material that gives and receives electrons in a positive electrode of a secondary battery. In a case in which the secondary battery is a lithium ion secondary battery, for example, the positive electrode active material is normally a material that can occlude and release lithium.

Although the following describes a positive electrode active material for a case in which the secondary battery is a lithium ion secondary battery as one example, the present disclosure is not limited to the following example.

The positive electrode active material for a lithium ion secondary battery may be a known positive electrode active material such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(CoMnNi)O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, a lithium-rich spinel compound represented by $Li_{1+x}Mn_{2-x}O_4$ ($0<x<2$), $Li[Ni_{0.17}Li_{0.2}Co_{0.07}Mn_{0.56}]O_2$, or $LiNi_{0.5}Mn_{1.5}O_4$ without any specific limitations.

Of the examples described above, lithium-containing cobalt oxide ($LiCoO_2$), lithium-containing nickel oxide ($LiNiO_2$), a lithium-containing complex oxide of Co—Ni—Mn, $Li[Ni_{0.17}Li_{0.2}Co_{0.07}Mn_{0.56}]O_2$, or $LiNi_{0.5}Mn_{1.5}O_4$ is preferably used as the positive electrode active material from a viewpoint of improving battery capacity and the like of the lithium ion secondary battery, and lithium-containing cobalt oxide ($LiCoO_2$), $Li[Ni_{0.17}Li_{0.2}Co_{0.07}Mn_{0.56}]O_2$, $LiNi_{0.5}Mn_{1.5}O_4$, or $LiNi_{0.5}Co_{0.2}Mn_{0.3}O_2$ is more preferably used as the positive electrode active material. One of these positive electrode active materials may be used individually, or two or more of these positive electrode active materials may be used in combination.

<Binder>

The binder holds components contained in a positive electrode mixed material layer of a positive electrode that is produced using a slurry for a secondary battery obtained according to the presently disclosed production method such that these components do not detach from the positive electrode mixed material layer. Although no specific limitations are placed on the binder that is used in the presently disclosed method of producing a slurry for a secondary battery positive electrode, it is preferable to use a fluoropolymer from a viewpoint of providing a slurry for a secondary battery positive electrode with even better stability.

[Fluoropolymer]

Examples of fluoropolymers that may be used include, but are not specifically limited to, polytetrafluoroethylene, polychlorotrifluoroethylene, polyvinylidene fluoride, polyvinyl fluoride, perfluoroalkoxy fluororesin, tetrafluoroethylene-hexafluoropropylene copolymer, ethylene-tetrafluoroethylene copolymer, ethylene-chlorotrifluoroethylene copolymer, and vinylidene fluoride-hexafluoropropylene copolymer. Of these examples, polyvinylidene fluoride (PVdF) is preferable as the fluoropolymer.

[Other Components]

Examples of other components that may be used include optional components such as reinforcing materials, leveling agents, viscosity modifiers, and additives for electrolyte solution. These other components are not specifically limited so long as they do not influence battery reactions. One of such other components may be used individually, or two or more of such other components may be used in combination in a freely selected ratio.

No specific limitations are placed on the method by which the above-described components are mixed in the presently disclosed method of producing a slurry for a secondary battery positive electrode. For example, the mixing can be performed using any of the same types of mixers that can be used to produce the conductive material dispersion liquid as previously described.

<Content of Conductive Material in Slurry for Secondary Battery Positive Electrode>

The content of the conductive material in the slurry for a secondary battery positive electrode obtained by the presently disclosed production method is not specifically limited but is preferably 0.1 parts by mass or less, and more preferably 0.08 parts by mass or less per 100 parts by mass of the positive electrode active material. When the content of the conductive material in the slurry for a secondary battery positive electrode is 0.1 parts by mass or less, it is possible to sufficiently provide the slurry for a secondary battery with both excellent slurry stability and excellent coating uniformity.

<Content of Binder in Slurry for Secondary Battery Positive Electrode>

Although no specific limitations are placed on the content of the binder in the slurry for a secondary battery positive electrode obtained by the presently disclosed production method, the content of the binder in terms of solid content per 100 parts by mass of the positive electrode active material is preferably 0.1 parts by mass or more, and is preferably 6 parts by mass or less, and more preferably 1 part by mass or less. When the content of the binder in the slurry for a secondary battery positive electrode is within any of the ranges set forth above, close adherence between a positive electrode mixed material layer and a current collector can be increased in a positive electrode that is produced using the slurry for a secondary battery positive electrode, and resistance of a secondary battery can be suppressed to a sufficiently low level.

The slurry for a secondary battery positive electrode that is obtained by the presently disclosed production method can, for example, suitably be used in the presently disclosed method of producing a positive electrode for a secondary battery, which is described below.

(Method of Producing Positive Electrode for Secondary Battery)

The presently disclosed method of producing an electrode for a secondary battery includes forming a positive electrode mixed material layer using a slurry for a secondary battery positive electrode obtained by the presently disclosed method of producing a slurry for a secondary battery positive electrode. The positive electrode mixed material layer can be formed, for example, through the inclusion of a step of applying the slurry for a secondary battery positive electrode obtained by the presently disclosed production method set forth above onto at least one side of a current collector (application step) and a step of drying the slurry for a secondary battery positive electrode that has been formed on at least one side of the current collector so as to form a positive electrode mixed material layer on at least one side of the current collector (drying step).

[Application Step]

The method by which the slurry for a secondary battery positive electrode is applied onto the current collector is not specifically limited and may be a commonly known method. Specific examples of application methods that can be used include doctor blading, dip coating, reverse roll coating, direct roll coating, gravure coating, extrusion coating, and brush coating. The thickness of the slurry coating on the current collector after application but before drying may be set as appropriate in accordance with the thickness of the positive electrode mixed material layer to be obtained after drying.

The current collector onto which the slurry for a secondary battery positive electrode is applied is a material having electrical conductivity and electrochemical durability. Specifically, the current collector may, for example, be made of iron, copper, aluminum, nickel, stainless steel, titanium, tantalum, gold, platinum, or the like. One of these materials may be used individually, or two or more of these materials may be used in combination in a freely selected ratio.

[Drying Step]

The method by which the slurry for a secondary battery positive electrode on the current collector is dried is not specifically limited and may be a commonly known method. Examples of drying methods that can be used include drying by warm, hot, or low-humidity air; drying in a vacuum; and drying by irradiation with infrared light, electron beams, or the like. Through drying of the slurry for a secondary battery positive electrode on the current collector in this manner, it is possible to form a positive electrode mixed material layer on the current collector and thereby obtain a positive electrode for a secondary battery that includes the current collector and the positive electrode mixed material layer.

After the drying step, the positive electrode mixed material layer may be further subjected to a pressing process such as mold pressing or roll pressing. The pressing process can improve close adherence between the positive electrode mixed material layer and the current collector.

A positive electrode that is obtained by the presently disclosed method of producing a positive electrode for a secondary battery includes a current collector and a positive electrode mixed material layer formed on the current collector, wherein the positive electrode mixed material layer is formed using a slurry for a secondary battery positive electrode that has been obtained by the presently disclosed production method set forth above. In other words, the positive electrode mixed material layer contains at least a positive electrode active material, carbon nanotubes serving as a conductive material, and a hydrogenated acrylonitrile-butadiene copolymer serving as a dispersant. Note that components contained in the positive electrode mixed material layer are components that were contained in the slurry for a secondary battery positive electrode obtained by the presently disclosed production method. Moreover, the preferred ratio of these components is the same as the preferred ratio thereof in the slurry for a secondary battery positive electrode.

As a result of the positive electrode mixed material layer in the positive electrode for a secondary battery obtained by the presently disclosed production method being formed using a slurry for a secondary battery positive electrode that contains the presently disclosed conductive material dispersion liquid, a good electrical conduction network is formed by the conductive material in the positive electrode mixed material layer. Therefore, by using this positive electrode for a secondary battery, it is possible to improve cycle characteristics of a secondary battery while also reducing internal resistance and improving output characteristics of the secondary battery.

(Method of Producing Secondary Battery)

The presently disclosed method of producing a secondary battery uses a positive electrode for a secondary battery that has been obtained by the presently disclosed production method. Moreover, through the presently disclosed method of producing a secondary battery, it is possible to produce a secondary battery having excellent output characteristics and cycle characteristics. Although the following describes, as one example, a case in which the secondary battery is a lithium ion secondary battery, the present disclosure is not limited to the following example.

<Negative Electrode>

A known negative electrode can be used as a negative electrode of the secondary battery. Specifically, a negative electrode formed of a thin sheet of lithium metal or a negative electrode obtained by forming a negative electrode mixed material layer on a current collector can, for example, be used.

The current collector may be made of a metal material such as iron, copper, aluminum, nickel, stainless steel, titanium, tantalum, gold, or platinum. The negative electrode mixed material layer may be a layer that contains a negative electrode active material and a binder for a negative electrode. Any known material can be used as the binder for a negative electrode without any specific limitations.

<Electrolyte Solution>

An organic electrolyte solution obtained by dissolving a supporting electrolyte in an organic solvent is normally used as an electrolyte solution. The supporting electrolyte of the lithium ion secondary battery may, for example, be a lithium salt. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and display a high degree of dissociation, and $LiPF_6$ is particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used include carbonates such as dimethyl carbonate (DMC), ethylene carbonate (EC), diethyl carbonate (DEC), propylene carbonate (PC), butylene carbonate (BC), and methyl ethyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region, and a mixture of ethylene carbonate and ethyl methyl carbonate is more preferable.

<Separator>

A known separator such as an organic separator may be used as a separator without any specific limitations. An organic separator is a porous member that is formed of an organic material. For example, the organic separator may be a microporous membrane or non-woven fabric that contains a polyolefin resin such as polyethylene or polypropylene, an aromatic polyamide resin, or the like.

In the presently disclosed method of producing a secondary battery, a step of producing a positive electrode according to the presently disclosed method of producing a positive electrode for a secondary battery set forth above may be performed, and then the obtained positive electrode and the negative electrode may be stacked with the separator in-between, the resultant laminate may be subjected to rolling, folding, or the like, as necessary, in accordance with the battery shape to place the laminate in a battery container, the electrolyte solution may be injected into the battery container, and the battery container may be sealed. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

Examples

The following describes the present disclosure based on examples. However, the present disclosure is not limited to these examples. In the following description, "%" and "parts" used in expressing quantities are by mass, unless otherwise specified.

Moreover, the proportion constituted by each monomer unit in a polymer is normally the same as the ratio (charging ratio) of a monomer capable of forming that monomer unit in a monomer composition that is used in polymerization of the polymer. In the examples and comparative examples, the following methods were used to measure or evaluate various physical properties.

<Iodine Value>

The iodine value of a polymer was determined in accordance with JIS K6235:2006.

<Weight-Average Molecular Weight>

The weight-average molecular weight of a polymer was measured by gel permeation chromatography (GPC). More specifically, the weight-average molecular weight was calculated as a standard substance-equivalent value by preparing a calibration curve for a standard substance using polystyrene. Moreover, the weight-average molecular weight distribution was evaluated by rounding to the second digit for a value of less than 10,000 and rounding to the third digit for a value of 10,000 or more. The measurement conditions and measurement apparatus were as follows.

Column: TSKgel α-M×2 (Ø7.8 mm I.D.×30 cm×2 columns; produced by Tosoh Corporation)
    Eluent: Dimethylformamide (50 mM lithium bromide, 10 mM phosphoric acid)
    Flow rate: 0.5 mL/min
    Sample concentration: Approximately 0.5 g/L (solid content concentration)
    Injection volume: 200 μL
    Column temperature: 40° C.
    Detector: Differential refractive index detector RI (HLC-8320 GPC RI detector produced by Tosoh Corporation)
    Detector conditions: RI: Pol (+), Res (1.0 s)
    Molecular weight marker: Standard Polystyrene Kit PStQuick K produced by Tosoh Corporation <Volume-Average Particle Diameter (D90) of CNTs in Conductive Material Dispersion Liquid>

A produced conductive material dispersion liquid was diluted to an appropriate concentration to obtain a measurement sample. A laser diffraction particle size distribution analyzer (SALD-7100 produced by Shimadzu Corporation) was used as a measurement apparatus to measure a particle size distribution (by volume) for CNTs and calculate the volume-average particle diameter (D90) of the CNTs in the conductive material dispersion liquid with the solvent refractive index taken to be 1.47 (solvent: N-methyl-2-pyrrolidone).

Note that the concentration of the measurement sample was set as a concentration such that light absorbance in the measurement apparatus was 0.2 or less.

<Slurry Stability>

The slurry stability of a slurry for a positive electrode was evaluated based on rate of viscosity change of the slurry for a positive electrode.

Specifically, a B-type viscometer (RB-80 L produced by Toki Sangyo Co., Ltd.) was used to measure the viscosity ($\eta 1$) of the slurry for a positive electrode straight after production with a temperature of 25° C., a rotation speed of 60 rpm, and a rotation time of 60 seconds. The slurry for a positive electrode was subsequently stored in a 25° C. environment for 5 days, and the viscosity ($\eta 2$) of the slurry for a positive electrode after storage was measured in the same manner as for measurement of the viscosity ($\eta 1$) described above. The obtained viscosities ($\eta 1$) and ($\eta 2$) were used to determine the viscosity change $\Delta \eta$ based on the following formula.

$$\text{Viscosity change } \Delta \eta\ (\%) = (|\eta 1 - \eta 2|/\eta 1) \times 100$$

The slurry stability of the slurry for a positive electrode was evaluated by the following standard. A smaller viscosity change $\Delta \eta$ indicates that the slurry for a positive electrode has better slurry stability and that the dispersion state of a conductive material contained in the slurry for a positive electrode can be better maintained.

A: Viscosity change $\Delta \eta$ of less than 20%
B: Viscosity change $\Delta \eta$ of not less than 20% and less than 50%
C: Viscosity change $\Delta \eta$ of 50% or more <Coating Uniformity>

A produced post-pressing positive electrode was cut out as 10 cm×10 cm in size. Thereafter, the surface of the cut-out positive electrode was visually checked, and coating uniformity was evaluated based on the number of irregularities (agglomerates) at the positive electrode surface. A smaller number of irregularities (agglomerates) visually observed at the positive electrode surface indicates that a slurry for a positive electrode can be applied more uniformly and has better coating uniformity.

A: Irregularities (agglomerates) cannot be visually observed at positive electrode surface
B: Irregularities (agglomerates) are visually observed at fewer than 5 locations at positive electrode surface
C: Irregularities (agglomerates) are visually observed at 5 or more locations at positive electrode surface <Output Characteristics>

A laminate-type lithium ion secondary battery that had been produced was constant-current charged with a current of 140 mA until the voltage reached 4.2 V and was then constant-voltage charged with a voltage of 4.2 V until the charging current reached 14 mA in a 25° C. environment. Next, the laminate-type lithium ion secondary battery was constant-current discharged with a current of 140 mA until the battery voltage reached 3 V so as to determine the initial capacity.

The laminate-type lithium ion secondary battery for which the initial capacity had been measured was then constant-current charged at 0.2C until the battery voltage reached 4.2 V and was constant-voltage charged with a voltage of 4.2 V until the charging current reached 0.02C in a 25° C. environment. Next, the laminate-type lithium ion secondary battery was constant-current discharged with a current of 2C until the battery voltage reached 3.0 V so as to determine the 2C capacity. A value of [(2C capacity)/(initial capacity)]×100(%) was determined as an output characteristic, and then output characteristics of the lithium ion secondary battery were evaluated by the following standard. A higher output characteristic value indicates that the lithium ion secondary battery has better initial output characteristics (i.e., has lower internal resistance).

A: Output characteristic of 90% or more
B: Output characteristic of not less than 80% and less than 90%
C: Output characteristic of less than 80%

<Cycle Characteristics>

A produced lithium ion secondary battery was subjected to 100 cycles of an operation of charging to a battery voltage of 4.2 V with a 1C constant current and discharging to a battery voltage of 3 V with a 1C constant current in a 45° C. environment. A charge/discharge capacity retention rate [=(B)/(A)×100(%)] was determined from the discharge capacity of the $100^{th}$ cycle (discharge capacity denoted as "B") relative to the discharge capacity of the $1^{st}$ cycle (discharge capacity denoted as "A"), and cycle characteristics of the lithium ion secondary battery were evaluated by the following standard. A larger charge/discharge capacity retention rate indicates that the lithium ion secondary battery has better cycle characteristics.

A: Charge/discharge capacity retention rate of 90% or more
B: Charge/discharge capacity retention rate of not less than 80% and less than 90%
C: Charge/discharge capacity retention rate of less than 80%

Example 1

<Production of Dispersant>

A reactor was charged with 180 parts of deionized water, 25 parts of sodium dodecylbenzenesulfonate aqueous solution (concentration: 10%) as an emulsifier, 40 parts of styrene as an aromatic vinyl monomer, 26 parts of acrylonitrile as a nitrile group-containing monomer, 4 parts of methacrylic acid as a carboxy group-containing monomer, and 2 parts of t-dodecyl mercaptan as a molecular weight modifier in this order. Next, gas inside of the reactor was purged three times with nitrogen, and then 30 parts of 1,3-butadiene as a conjugated diene monomer was added into the reactor. The reactor was held at 10° C. while adding 0.1 parts of cumene hydroperoxide as a polymerization initiator so as to initiate a polymerization reaction that was then caused to progress under stirring. At the point at which the conversion rate of monomer to polymer reached 85%, 2,2,6,6-tetramethylpiperidine-1-oxyl (TEMPO) was caused to act as an inhibitor, and then residual monomer was removed using a rotary evaporator with a water temperature of 60° C. to yield a water dispersion of an acrylonitrile-butadiene copolymer (A) serving as a precursor for a dispersant. The obtained water dispersion (total solid content: 48 g) of the acrylonitrile-butadiene copolymer (A) was loaded into a 1 L stirrer-equipped autoclave, and nitrogen gas was passed for 10 minutes so as to remove dissolved oxygen in the water dispersion.

Thereafter, 50 mg of palladium acetate as a hydrogenation reaction catalyst was dissolved in 180 mL of water to which nitric acid had been added in an amount of 4 molar equivalents relative to the palladium (Pd) and was then added into the autoclave. The system was purged twice with hydrogen gas, and then contents of the autoclave were heated to 50° C. in a state in which the pressure was raised to 3 MPa with hydrogen gas, and a hydrogenation reaction was performed for 6 hours to yield a hydrogenated acrylonitrile-butadiene copolymer (A) as a dispersant. The hydrogenated acrylonitrile-butadiene copolymer (A) that was obtained had an iodine value of 15 mg/100 mg.

<Production of Dispersant-Containing NMP Solution>

A water dispersion of the hydrogenated acrylonitrile-butadiene copolymer (A) obtained as described above was mixed with NMP as a solvent to obtain a mixed liquid. Next, water contained in the obtained mixed liquid was completely evaporated under reduced pressure to yield a hydrogenated acrylonitrile-butadiene copolymer (A)-containing NMP solution. The hydrogenated acrylonitrile-butadiene copolymer (A)-containing NMP solution that was obtained was used as a dispersant-containing NMP solution.

<Production of Conductive Material Dispersion Liquid>

Stirring (3,000 rpm, 10 minutes) of 0.06 parts of CNTs (A) (specific surface area: 1,200 m$^2$/g) as a conductive material, 0.12 parts (in terms of solid content) of the dispersant-containing NMP solution obtained as described above, and 99.1 parts of NMP as a solvent was performed using a disper blade, and then 2 hours of mixing was performed at a circumferential speed of 8 m/s using a bead mill in which zirconia beads of 1 mm in diameter were used so as to produce a conductive material dispersion liquid (A) having a solid content concentration of 0.9 mass % (0.3 mass % in terms of CNTs). The volume-average particle diameter (D90) of the CNTs (A) in the conductive material dispersion liquid (A) was 20 μm.

<Production of Slurry for Positive Electrode>

A slurry for a positive electrode was produced by stirring (60 rpm, 30 minutes) 100 parts of lithium cobalt oxide (LiCoO$_2$; average particle diameter: 10 μm) as a positive electrode active material, 0.18 parts in terms of solid content (0.06 parts in terms of CNTs) of the conductive material dispersion liquid (A) obtained as described above, 1.0 parts of polyvinylidene fluoride (PVdF; #7208 produced by Kureha Corporation) as a binder, and NMP as a solvent in a planetary mixer. Note that the additive amount of NMP was adjusted such that the viscosity of the obtained slurry for a positive electrode (measured by single-cylinder rotational viscometer in accordance with JIS Z8803:1991; temperature: 25° C.; rotation speed: 60 rpm) was within a range of 4,000 mPa·s to 5,000 mPa·s. The obtained slurry for a positive electrode was used to evaluate slurry stability and coating uniformity. The results are shown in Table 1.

<Production of Positive Electrode>

Aluminum foil of 20 μm in thickness was prepared as a current collector. The slurry for a positive electrode obtained as described above was applied by a comma coater such as to have a coating weight after drying of 10 mg/cm$^2$ at one side of the aluminum foil, was dried at 90° C. for 20 minutes and at 120° C. for 20 minutes, and was subsequently subjected to 10 hours of vacuum heat treatment at 60° C. to obtain a positive electrode web. This positive electrode web was rolled by roll pressing to produce a sheet-shaped positive electrode including the aluminum foil and a positive electrode mixed material layer of 3.2 g/cm$^3$ in density (one side). The thickness of the sheet-shaped positive electrode was 30 μm. This sheet-shaped positive electrode was cut to 4.6 cm in width and 50 cm in length to obtain a positive electrode for a lithium ion secondary battery.

<Production of Negative Electrode>

A slurry for a negative electrode was produced by stirring 100 parts of spherical artificial graphite (volume-average particle diameter: 12 μm) as a negative electrode active material, 1.5 parts of a styrene-butadiene polymer as a binder for a negative electrode, 1 part of carboxymethyl cellulose as a thickener, and an appropriate amount of water as a dispersion medium in a planetary mixer.

Next, copper foil of 15 μm in thickness was prepared as a current collector. The slurry for a negative electrode obtained as described above was applied such as to have a coating weight after drying of 7 mg/cm$^2$ at one side of the copper foil, and was then dried at 60° C. for 20 minutes and at 120° C. for 20 minutes to obtain a negative electrode web. This negative electrode web was rolled by roll pressing to produce a sheet-shaped negative electrode that included the copper foil and a negative electrode mixed material layer of 1.6 g/cm$^3$ in density (one side). This sheet-shaped negative electrode was cut to 4.8 cm in width and 52 cm in length to obtain a negative electrode for a lithium ion secondary battery.

<Production of Lithium Ion Secondary Battery>

The positive electrode and negative electrode obtained as described above were wound up with a separator (microporous membrane of 15 μm in thickness made of polypropylene) interposed therebetween using a core of 20 mm in diameter so as to obtain a roll. The obtained roll was compressed from one direction to a thickness of 4.5 mm at a rate of 10 mm/s. Note that the compressed roll had an elliptical shape in plan view, and the ratio of the major axis to the minor axis (major axis/minor axis) thereof was 7.7.

In addition, an electrolyte solution [chemical composition: LiPF$_6$ solution of 1.0 M in concentration (solvent: mixed solution having 5 mass % of fluoroethylene carbonate added to mixed solvent of ethylene carbonate/ethyl methyl carbonate=3/7 (mass ratio); additive: 2 volume % of vinylene carbonate)] was prepared.

The compressed roll was subsequently housed inside a laminate case made of aluminum together with 3.2 g of the non-aqueous electrolyte solution. After connecting a nickel lead to a specific position on the negative electrode and connecting an aluminum lead to a specific position on the positive electrode, an opening of the laminate case was thermally sealed to obtain a lithium ion secondary battery. This lithium ion secondary battery had a pouch shape of approximately 35 mm in width, approximately 50 mm in height, and approximately 5 mm in thickness. The nominal capacity of the battery was 750 mAh. The obtained lithium ion secondary battery was used to evaluate output characteristics and cycle characteristics. The results are shown in Table 1.

Example 2

A conductive material dispersion liquid (B) was produced in the same way as in Example 1 with the exception that CNTs (B) (specific surface area: 910 $m^2/g$) were used as a conductive material instead of the CNTs (A). Moreover, a slurry for a positive electrode, a positive electrode, a negative electrode, and a lithium ion secondary battery were produced in the same way as in Example 1 with the exception that the conductive material dispersion liquid (B) was used instead of the conductive material dispersion liquid (A). Various evaluations were performed in the same way as in Example 1. The results are shown in Table 1.

Example 3

A slurry for a positive electrode, a positive electrode, a negative electrode, and a lithium ion secondary battery were produced in the same way as in Example 1 with the exception that the amount of the conductive material dispersion liquid (A) was changed to 0.27 parts in terms of solid content (0.09 parts in terms of CNTs) in production of the slurry for a positive electrode. Various evaluations were performed in the same way as in Example 1. The results are shown in Table 1.

Example 4

A slurry for a positive electrode, a positive electrode, a negative electrode, and a lithium ion secondary battery were produced in the same way as in Example 1 with the exception that the amount of palladium acetate used as a hydrogenation reaction catalyst was changed to 25 mg in production of the dispersant such that the iodine value of the hydrogenated acrylonitrile-butadiene copolymer used as the dispersant was adjusted to 22 mg/100 mg. Various evaluations were performed in the same way as in Example 1. The results are shown in Table 1.

Example 5

A slurry for a positive electrode, a positive electrode, a negative electrode, and a lithium ion secondary battery were produced in the same way as in Example 1 with the exception that the ratio (mass ratio) of the dispersant (hydrogenated acrylonitrile-butadiene copolymer) relative to the conductive material (CNTs (A)) in the conductive material dispersion liquid (A) was adjusted to 1:1 in production of the slurry for a positive electrode. Various evaluations were performed in the same way as in Example 1. The results are shown in Table 1.

Example 6

A conductive material dispersion liquid (C) was produced in the same way as in Example 1 with the exception that the circumferential speed during mixing of components was changed to 6 m/s in production of the conductive material dispersion liquid. The volume-average particle diameter (D90) of the CNTs in the obtained conductive material dispersion liquid (C) was 45 μm. Moreover, a slurry for a positive electrode, a positive electrode, a negative electrode, and a lithium ion secondary battery were produced in the same way as in Example 1 with the exception that the conductive material dispersion liquid (C) was used instead of the conductive material dispersion liquid (A). Various evaluations were performed in the same way as in Example 1. The results are shown in Table 1.

Example 7

A slurry for a positive electrode, a positive electrode, a negative electrode, and a lithium ion secondary battery were produced in the same way as in Example 1 with the exception that the amount of acrylonitrile as a nitrile group-containing monomer was changed to 34 parts, the amount of methacrylic acid as a carboxy group-containing monomer was changed to 4 parts, the amount of 1,3-butadiene was changed to 62 parts, and styrene was not used in production of the dispersant. Various evaluations were performed in the same way as in Example 1. The results are shown in Table 1.

Example 8

A slurry for a positive electrode, a positive electrode, a negative electrode, and a lithium ion secondary battery were produced in the same way as in Example 1 with the exception that the positive electrode active material was changed to a ternary active material ($LiNi_{0.5}Co_{0.2}Mn_{0.3}O_2$; average particle diameter: 10 μm) in production of the slurry for a positive electrode. Various evaluations were performed in the same way as in Example 1. The results are shown in Table 1.

Comparative Example 1

A slurry for a positive electrode, a positive electrode, a negative electrode, and a lithium ion secondary battery were produced in the same way as in Example 1 with the exception that a hydrogenated acrylonitrile-butadiene copolymer was not used as a dispersant in production of the slurry for a positive electrode. Various evaluations were performed in the same way as in Example 1. The results are shown in Table 1.

Comparative Example 2

A slurry for a positive electrode, a positive electrode, a negative electrode, and a lithium ion secondary battery were produced in the same way as in Example 1 with the exception that CNTs (C) (specific surface area: 390 $m^2/g$) were used as a conductive material instead of the CNTs (A) in production of the conductive material dispersion liquid.

Various evaluations were performed in the same way as in Example 1. The results are shown in Table 1.

Comparative Example 3

A conductive material dispersion liquid (X) was produced in the same way as in Example 1 with the exception that the circumferential speed during mixing of components was changed to 4 m/s in production of the conductive material dispersion liquid. The volume-average particle diameter (D90) of the CNTs in the obtained conductive material dispersion liquid (X) was 70 μm. Moreover, a slurry for a positive electrode, a positive electrode, a negative electrode, and a lithium ion secondary battery were produced in the same way as in Example 1 with the exception that the conductive material dispersion liquid (X) was used instead of the conductive material dispersion liquid (A). Various evaluations were performed in the same way as in Example 1. The results are shown in Table 1.

TABLE 1

| | | | | Example 1 | Example 2 | Example 3 | Example 4 |
|---|---|---|---|---|---|---|---|
| Slurry for secondary battery positive electrode | Positive electrode active material | | Type | LCO | LCO | LCO | LCO |
| | | | Amount [parts by mass] | 100 | 100 | 100 | 100 |
| | Conductive material | | Type | CNT | CNT | CNT | CNT |
| | | | Specific surface area [$m^2/g$] | 1200 | 910 | 1200 | 1200 |
| | | | Amount [parts by mass] | 0.06 | 0.06 | 0.09 | 0.06 |
| | Volume-average particle diameter (D90) of conductive material in conductive material dispersion liquid [μm] | | | 20 | 20 | 20 | 20 |
| | Binder | | Type | PVdF | PVdF | PVdF | PVdF |
| | | | Amount [parts by mass] | 1 | 1 | 1 | 1 |
| | Dispersant Hydrogenated acrylonitrile-butadiene copolymer | Aromatic vinyl monomer unit | Type | ST | ST | ST | ST |
| | | | [Mass %] | 40 | 40 | 40 | 40 |
| | | Linear alkylene structural unit having carbon number of 4 or more | Type | H-BD + BD | H-BD + BD | H-BD + BD | H-BD + BD |
| | | | [Mass %] | 30 | 30 | 30 | 30 |
| | | Nitrile group-containing monomer unit | Type | AN | AN | AN | AN |
| | | | [Mass %] | 26 | 26 | 26 | 26 |
| | | Hydrophilic group-containing monomer unit | Type | MAA | MAA | MAA | MAA |
| | | | [Mass %] | 4 | 4 | 4 | 4 |
| | | Weight-average molecular weight (Mw) [—] | | 50,000 | 50,000 | 50,000 | 50,000 |
| | | Iodine value [mg/100 mg] | | 15 | 15 | 15 | 22 |
| | | Amount [parts by mass] | | 0.12 | 0.12 | 0.18 | 0.12 |
| | | Amount (relative to amount of conductive material) [times] | | 2 | 2 | 2 | 2 |
| Evaluation | | Slurry stability | | A | A | A | B |
| | | Coating uniformity | | A | A | A | A |
| | | Output characteristics | | A | A | A | A |
| | | Cycle characteristics | | A | A | A | B |

| | | | | Example 5 | Example 6 | Example 7 | Example 8 |
|---|---|---|---|---|---|---|---|
| Slurry for secondary battery positive electrode | Positive electrode active material | | Type | LCO | LCO | LCO | NCM |
| | | | Amount [parts by mass] | 100 | 100 | 100 | 100 |
| | Conductive material | | Type | CNT | CNT | CNT | CNT |
| | | | Specific surface area [$m^2/g$] | 1200 | 1200 | 1200 | 1200 |
| | | | Amount [parts by mass] | 0.06 | 0.06 | 0.06 | 0.06 |
| | Volume-average particle diameter (D90) of conductive material in conductive material dispersion liquid [μm] | | | 20 | 45 | 20 | 20 |
| | Binder | | Type | PVdF | PVdF | PVdF | PVdF |
| | | | Amount [parts by mass] | 1 | 1 | 1 | 1 |
| | Dispersant Hydrogenated acrylonitrile-butadiene copolymer | Aromatic vinyl monomer unit | Type | ST | ST | — | ST |
| | | | [Mass %] | 40 | 40 | — | 40 |
| | | Linear alkylene structural unit having carbon number of 4 or more | Type | H-BD + BD | H-BD + BD | H-BD + BD | H-BD + BD |
| | | | [Mass %] | 30 | 30 | 62 | 30 |
| | | Nitrile group-containing monomer unit | Type | AN | AN | AN | AN |
| | | | [Mass %] | 26 | 26 | 34 | 26 |
| | | Hydrophilic group-containing monomer unit | Type | MAA | MAA | MAA | MAA |
| | | | [Mass %] | 4 | 4 | 4 | 4 |
| | | Weight-average molecular weight (Mw) [—] | | 50,000 | 50,000 | 50,000 | 50,000 |
| | | Iodine value [mg/100 mg] | | 15 | 15 | 15 | 15 |
| | | Amount [parts by mass] | | 0.06 | 0.12 | 0.12 | 0.12 |
| | | Amount (relative to amount of conductive material) [times] | | 1 | 2 | 2 | 2 |

TABLE 1-continued

| Evaluation | Slurry stability | A | B | B | A |
|---|---|---|---|---|---|
| | Coating uniformity | B | B | B | A |
| | Output characteristics | A | A | A | A |
| | Cycle characteristics | B | B | B | A |

| | | | | Comparative Example 1 | Comparative Example 2 | Comparative Example 3 |
|---|---|---|---|---|---|---|
| Slurry for secondary battery positive electrode | Positive electrode active material | | Type | LCO | LCO | LCO |
| | | | Amount [parts by mass] | 100 | 100 | 100 |
| | Conductive material | | Type | CNT | CNT | CNT |
| | | | Specific surface area [m$^2$/g] | 1200 | 390 | 1200 |
| | | | Amount [parts by mass] | 0.06 | 0.06 | 0.06 |
| | Volume-average particle diameter (D90) of conductive material in conductive material dispersion liquid [μm] | | | 20 | 20 | 70 |
| | Binder | | Type | PVdF | PVdF | PVdF |
| | | | Amount [parts by mass] | 1 | 1 | 1 |
| Dispersant | Hydrogenated acrylonitrile-butadiene copolymer | Aromatic vinyl monomer unit | Type | — | ST | ST |
| | | | [Mass %] | — | 40 | 40 |
| | | Linear alkylene structural unit having carbon number of 4 or more | Type | — | H-BD + BD | H-BD + BD |
| | | | [Mass %] | — | 30 | 30 |
| | | Nitrile group-containing monomer unit | Type | — | AN | AN |
| | | | [Mass %] | — | 26 | 26 |
| | | Hydrophilic group-containing monomer unit | Type | — | MAA | MAA |
| | | | [Mass %] | — | 4 | 4 |
| | | Weight-average molecular weight (Mw) [—] | | — | 50,000 | 50,000 |
| | | Iodine value [mg/100 mg] | | — | 15 | 15 |
| | | Amount [parts by mass] | | — | 0.12 | 0.12 |
| | | Amount (relative to amount of conductive material) [times] | | — | 2 | 2 |
| Evaluation | | Slurry stability | | B | A | C |
| | | Coating uniformity | | C | A | C |
| | | Output characteristics | | A | C | B |
| | | Cycle characteristics | | C | A | C |

In Table 1:
"LCO" indicates lithium cobalt oxide (LiCoO$_2$);
"NCM" indicates ternary active material (LiNi$_{0.5}$Co$_{0.2}$Mn$_{0.3}$O$_2$);
"CNT" indicates carbon nanotubes;
"PVdF" indicates polyvinylidene fluoride;
"ST" indicates styrene;
"H-BD" indicates hydrogenated 1,3-butadiene unit;
"BD" indicates butadiene;
"AN" indicates acrylonitrile; and
"MAA" indicates methacrylic acid.

It can be seen from Table 1 that a slurry for a positive electrode having excellent slurry stability and coating uniformity can be produced and that output characteristics and cycle characteristics of a lithium ion secondary battery including a positive electrode that is produced using the slurry for a positive electrode can be improved when using a conductive material dispersion liquid that contains CNTs having a specific surface area of not less than 800 m$^2$/g and not more than 1,300 m$^2$/g as a conductive material, a hydrogenated acrylonitrile-butadiene copolymer having a weight-average molecular weight of 200,000 or less as a dispersant, and a solvent and in which the volume-average particle diameter (D90) of the conductive material (CNTs) is 50 μm or less (Examples 1 to 8).

In contrast, it can be seen that an obtained slurry for a positive electrode has poor slurry stability and/or coating uniformity or that an obtained lithium ion secondary battery has poor output characteristics and/or cycle characteristics when using a conductive material dispersion liquid that does not contain a dispersant (Comparative Example 1), when the specific surface area of a conductive material (CNTs) in a conductive material dispersion liquid is less than 800 m$^2$/g (Comparative Example 2), and when the volume-average particle diameter (D90) of a conductive material (CNTs) in a conductive material dispersion liquid is more than 50 μm (Comparative Example 3).

INDUSTRIAL APPLICABILITY

According to the present disclosure, it is possible to provide a method of producing a slurry for a secondary battery positive electrode that can cause a secondary battery to display excellent output characteristics and cycle characteristics and also a conductive material dispersion liquid that can suitably be used to produce this slurry for a secondary battery positive electrode.

Moreover, according to the present disclosure, it is possible to provide a method of producing a positive electrode for a secondary battery that can be used to produce a secondary battery having excellent output characteristics and cycle characteristics.

Furthermore, according to the present disclosure, it is possible to provide a method of producing a secondary battery having excellent output characteristics and cycle characteristics.

The invention claimed is:
1. A conductive material dispersion liquid comprising a conductive material, a dispersant, and a solvent, wherein the conductive material is one or more carbon nanotubes having a specific surface area of not less than 800 m$^2$/g and not more than 1,300 m$^2$/g, the carbon nanotubes have a volume-average particle diameter (D90) of 50 μm or less in the conductive material dispersion liquid, the dispersant is a hydrogenated acrylonitrile-butadiene copolymer, and the hydrogenated acrylonitrile-butadiene copolymer has a weight-average molecular weight of 200,000 or less.

2. The conductive material dispersion liquid according to claim 1, wherein the hydrogenated acrylonitrile-butadiene copolymer has an iodine value of 25 mg/100 mg or less.

3. The conductive material dispersion liquid according to claim 1, wherein content of the dispersant in the conductive material dispersion liquid is not less than 50 parts by mass and not more than 400 parts by mass per 100 parts by mass of the conductive material.

4. A method of producing a slurry for a non-aqueous secondary battery positive electrode comprising mixing a positive electrode active material, a binder, and the conductive material dispersion liquid according to claim 1 to obtain a slurry for a non-aqueous secondary battery positive electrode.

5. The method of producing a slurry for a non-aqueous secondary battery positive electrode according to claim 4, wherein content of the conductive material in the slurry for a non-aqueous secondary battery positive electrode is less than 0.1 parts by mass per 100 parts by mass of the positive electrode active material.

6. The method of producing a slurry for a non-aqueous secondary battery positive electrode according to claim 4, wherein content of the binder in the slurry for a non-aqueous secondary battery positive electrode is not less than 0.1 parts by mass and not more than 6 parts by mass per 100 parts by mass of the positive electrode active material.

7. A method of producing a positive electrode for a non-aqueous secondary battery comprising forming a positive electrode mixed material layer using a slurry for a non-aqueous secondary battery positive electrode obtained by the method according to claim 4.

8. A method of producing a non-aqueous secondary battery comprising using a positive electrode for a non-aqueous secondary battery obtained by the method according to claim 7.

* * * * *